United States Patent
Elferich

(10) Patent No.: US 6,822,881 B2
(45) Date of Patent: Nov. 23, 2004

(54) CONTROL DEVICE FOR A RESONANT CONVERTER

(75) Inventor: Reinhold Elferich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 199 days.

(21) Appl. No.: 10/142,586

(22) Filed: May 9, 2002

(65) Prior Publication Data

US 2002/0186026 A1 Dec. 12, 2002

(30) Foreign Application Priority Data

May 9, 2001 (DE) .......................................... 101 22 534
Sep. 4, 2001 (DE) .......................................... 101 43 251

(51) Int. Cl.[7] ............................................. H02M 3/335
(52) U.S. Cl. ................................................. 363/21.02
(58) Field of Search ......................... 363/15–17, 21.01, 363/21.02, 97, 98, 131, 132, 56.01, 56.02, 20.02

(56) References Cited

U.S. PATENT DOCUMENTS

| | | | | |
|---|---|---|---|---|
| 5,448,465 A | * | 9/1995 | Yoshida et al. ................ | 363/15 |
| 5,986,895 A | | 11/1999 | Stewart et al. ................. | 363/16 |
| 6,018,467 A | * | 1/2000 | Majid et al. ................... | 363/16 |
| 6,151,222 A | * | 11/2000 | Barrett ......................... | 363/16 |
| 6,222,742 B1 | * | 4/2001 | Schlecht ....................... | 363/16 |
| 6,344,979 B1 | * | 2/2002 | Huang et al. ................. | 363/16 |
| 6,452,817 B1 | * | 9/2002 | Yasumura ................ | 363/21.03 |

FOREIGN PATENT DOCUMENTS

WO      0898360      2/1999      ........ H02M/7/5387

* cited by examiner

Primary Examiner—Matthew V. Nguyen

(57) ABSTRACT

A resonant converter and a control method for a resonant converter are proposed. The resonant converter comprises a resonant circuit with a transformer, which circuit is supplied with power by an AC inverter with a switched AC voltage, preferably a pulse-width modulated voltage. The circuit comprises a plurality of secondary units each consisting of a secondary winding of the transformer and at least one rectifier element (diode). The secondary units are subdivided into secondary units of the first and second type, secondary units of the first type and secondary units of the second type having opposite orientations. Secondary units of opposite types preferably have either with the same wiring a different winding orientation or with opposite wiring the same winding orientation. The resonant converter produces at least two output voltages, a first output voltage of which depending on the voltage on the first secondary unit ("direct output") and a second output voltage depending only on the voltage of the second secondary unit or on the voltage on the first and the second secondary unit ("stack output"). In addition, the converter comprises a control device for separately controlling the two output voltages caused by the driving of the inverter. In various embodiments either frequency and duty cycle or the pulse durations of the pulse-width modulated voltage to be generated are predefined for the inverters, so that with these two parameters as a setting signal the two output voltages can be controlled independently of each other. Different controllers are proposed here for different output configurations.

20 Claims, 12 Drawing Sheets

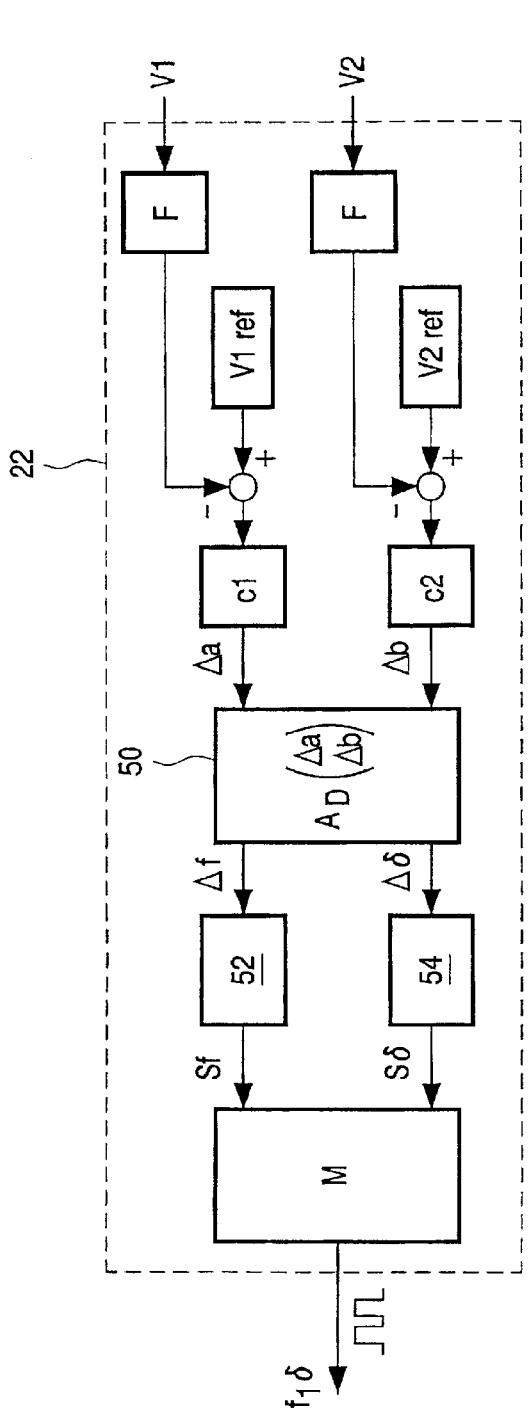
Fig.5
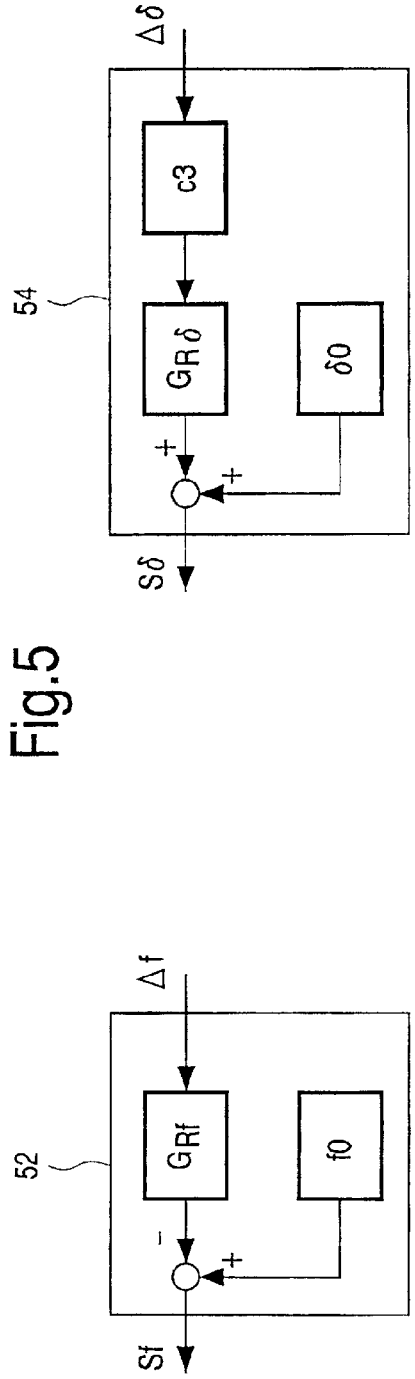
Fig.5b
Fig.5a

CONTROL DEVICE FOR A RESONANT CONVERTER

DESCRIPTION

The invention relates to a resonant converter comprising a control system, a control method for a resonant converter and a switched-mode power supply.

A switched converter converts a DC voltage on the input side into one or more DC voltages on the output side in that the input-side DC voltage is first chopped, i.e. converted into a switched AC voltage and with this switched AC voltage a resonant circuit comprising at least one capacitor is supplied with power, which capacitor comprises the primary side of a transformer. On the secondary side the transformer comprises one or various windings whose voltages are rectified for generating DC output voltages.

Known switched-mode power supplies comprise a power supply input circuit for connection to the mains and a switched converter. The switched-mode input circuit renders an intermediate-circuit DC voltage available with which the switched converter is supplied. The intermediate-circuit DC voltage is converted into one or more output DC voltages by the converter.

Many circuits for switched converters are known. This comprises in addition to resonant converters also circuits in which no resonant circuit is used. With converters of this type it is possible to manufacture inexpensive, small, light-weight power supply units/switched-mode power supplies, which can advantageously be used in consumer electronics appliances such as set top boxes, satellite receivers, television sets, computer monitors, video recorders and compact audio systems. In these applications there is often a need for converters that generate multiple output voltages on multiple converter outputs from one input DC voltage.

At least one of the output voltages is customarily controlled to a set value. In state-of-the-art converters which produce a plurality of output voltages and each of the output voltages is assigned a secondary winding of the transformer, various output voltages cannot be controlled independently of one another. In such circuits a control device is provided for only one of the output voltages. It is then assumed that the other voltages—which are related to a controlled voltage as regards the number-of-windings ratio—are "controlled along" with these voltages. However, this has considerable disadvantages at the individual outputs in case of strongly differing loads.

A known topology of a converter comprises the so-termed load resonant converter. In a known circuit for this a half bridge supplied with a DC voltage is used as an inverter, which half bridge feeds a series combination of a resonant capacitor and the primary side of a transformer. The resonant capacitor together with the leakage inductance of the transformer as well as further, also secondary-side inductances or capacitances, forms a resonant circuit. On the secondary side the load resonant converter includes one or more secondary windings. In this way a number of output DC voltages is supplied which, after being rectified, are customarily filtered by at least one capacitive filter.

To control the output voltage of such a resonant converter it is known to change the driving of the inverter. The switches of the inverter are then driven so that an AC voltage, in many cases a pulse-width modulated voltage, is generated that has predefined parameters (for example, frequency). By variation of the frequency of this voltage, the value of the output voltage can be controlled. The output voltage then rises the more the frequency comes nearer to the resonant frequency of the resonant circuit. LLC converters commonly operate in the hypercritical domain i.e. supply of the resonant circuit with a voltage whose frequency lies above the resonant frequencies. In this case the output voltage can be increased in that the frequency of the voltage is reduced. In known load resonant converters only one output voltage can be controlled directly. Further output voltages are coupled to the directly controlled output voltage via the number-of-windings ratio and are thus "controlled along".

The type of converter dominating in consumer electronics appliances is the flyback converter. This is a non-resonant converter. On the primary side generally only one switching element is necessary for the inverter. The flyback converter executes a one-way rectification on each of its outputs. One of the outputs is controlled directly.

If the flyback converter needs to have a second output voltage which must be controlled directly, it is known that a further converter known as a step-down converter or Buck converter is to be connected to one of the outputs of the flyback converter, which further converter is fed with the first output voltage of the flyback converter and produces the second output voltage with a separate control. Such a circuit comprising two converters is very costly, however.

Another extension of the flyback converter topology which renders two controlled output voltages available is the so-termed "double forward-flyback" converter. A respective topology is described, for example, in IEEE-PESC 1988, p. 142 "A Complete Study of the Double Forward-Flyback Converter" by J. Sebastian et al. As with the basic flyback topology, this is not a resonant circuit, but the primary-side AC voltage which is generated via a simple switch directly feeds the primary side of the transformer. On the secondary side there are two secondary units each formed by a secondary winding of the transformer and one one-way rectifier element (diode). The resulting secondary voltages are filtered capacitively by one secondary unit and inductively by the other secondary unit. In this way it is possible to control an (inductively filtered) output voltage via the duty cycle of the pulse-width modulated voltage and the other (capacitively filtered) output voltage via the frequency of the pulse-width modulated voltage. But this "hard switching" topology has considerable switching losses.

In modem consumer electronics appliances it is ever more necessary for two supply voltages can be controlled separately.

It is therefore an object of the invention to provide a resonant converter and a control method which can be realized cost effectively and nevertheless offer the possibility of control of a plurality of output voltages.

This object is achieved by a resonant converter as claimed in claim 1 and a control method as claimed in claim 13 and a switched-mode power supply as claimed in claim 14. Dependent claims relate to advantageous embodiments of the invention.

According to the invention a resonant topology is proposed i.e. a resonant circuit is fed by an inverter which resonant circuit comprises, for example, a series capacitance and the primary side of a transformer. Also further, secondary-side elements may be part of the resonant circuit. In such a resonant topology the output voltage can be controlled via the frequency of the primary-side AC voltage. By hypercritical operation there may be achieved with such a resonant converter that the resonant circuit at the source behaves as an inductive load, so that a switching without losses is possible (zero-voltage switching).

The separate control of different output voltages is made possible according to the invention in that two types of secondary units are provided, each formed by a secondary winding of the transformer and at least one rectifier element. A first secondary unit (a first type of secondary units, respectively) and a second secondary unit (a second type of secondary units, respectively) here have opposite orientations. The orientation is here to be understood as the direction of winding in conjunction with the wiring with the rectifier element. For example, two secondary units of opposite types may be distinguished in that with otherwise the same circuit the direction of winding on the common transformer core is opposite. It is also possible, when two secondary windings have the same direction of winding, that the secondary unit of the first and second type are distinguished by a respective converted wiring. Wiring is here understood to mean the connection of the rectifier element, which is preferably a one-way rectifier element, for example, a diode, incorporated in one branch.

The distinction in two oppositely oriented types of secondary units provides that the two secondary units behave differently depending on their excitation. When operated with an AC voltage, the secondary units of the first and second types are powered successively. In essence, during a positive voltage peak on the primary side of the transformer, a current flows through the secondary unit of the first type. During the negative voltage peak on the primary side of the transformer a current accordingly flows through the secondary unit of the second type. As will be explained in detail hereinbelow, it is possible to utilize this distinction in a purposeful manner while more or less power is supplied by a secondary unit of the first or second type through an accordingly purposeful excitation.

The secondary units may also be DC isolated. But it is also possible for two secondary units to have a common tapping point.

Secondary voltages arise on the secondary units as a result of rectification by the rectifier element. These secondary voltages can be directly used as an output voltage, customarily after (preferably capacitive) filtering. Such an output in which solely a secondary unit produces the output signal, is referred to here as the direct output. But there may also be provided that a "stack output" is used whose output voltage drops via one or more secondary voltages of a secondary unit of the first type and one or more secondary voltages of secondary units of the second type which are connected in series, for example. Examples for such topologies will be explained hereinafter with reference to the Figures.

The control system according to the invention controls both the first and the second output voltage to a desired value by driving the inverter. The inverter produces a switched AC voltage, preferably a pulse-width modulated voltage of customarily constant amplitude. Preferably two control variables are used for the separate control of the two output voltages, which control variables predefine the waveform of the pulse-width modulated voltage. Various proposals provide for this, on the one hand, the predetermined switching frequency and duty cycle of the pulse-width modulated voltage and the predefined switch-on times for the positive and negative voltage pulse, on the other.

A modulator which drives the inverter based on predefined values of the control device is preferably used in that a pulse signal is predefined for driving the switch of the inverter. Especially with low powers a half bridge is preferred as an inverter for reasons of cost-efficiency, with which half-bridge voltage pulses are generated from an input DC voltage by alternately switching two switches. A full bridge may also be used in this respect.

A general model with which controls are combined for various topologies will be explained hereinbelow with reference to the Figures. Hereinafter several further embodiments of the invention relating to concrete controls will be discussed.

According to a first proposal, control error sizes are determined for two output voltages for the separate control of the two output voltages. This comprises the formation of the control difference and preferably also a scaling. Such a scaling is particularly advantageous when the two voltages differ considerably. Furthermore, a sum and a difference size is determined from the control errors, the sum size depending on the sum of the control errors and the difference size on the difference between the control errors. By "depending" is meant here that further operations, for example, scaling or other operations can be applied to the individual errors or to the sum or difference, as appropriate. Sum and difference sizes may also be directly equal to the sum of the difference of the control errors. Finally, the sum size predefines the frequency and the difference size the duty cycle of the pulse-width modulated voltage, while preferably one-dimensional control units, for example, I, PI or PID controllers are used.

According to a second proposal two voltages are controlled separately in that first, as described above, control error magnitudes are determined for the two output voltages to be controlled. A default value for the duration of a first positive voltage pulse of the pulse-width modulated voltage is determined from the first control error size—preferably by a one-dimensional controller, for example PID controller—and from the second control error size a default value for the duration of a negative voltage pulse (when a full bridge is used) or the duration in which the value of the pulse-width modulated voltage equals zero (when a half bridge is used). This control is preferably combined with the default of a minimum and/or maximum duration for the respective voltage pulse, to lay down an operating range for the switching frequency. In a hypercritical area, that is to say, area with a switching frequency beyond the resonant frequency/frequencies of the resonant circuit, the allocation is to be selected such that by setting the duration of the positive voltage pulse, the secondary voltages of the secondary units of the second type (which are powered in essence during the negative voltage pulse!) are controlled and vice versa.

Control units for realizing said proposals may be designed in many different ways. Integrated or discrete analog or digital circuits may be considered then. The control units may also be completely implemented as a digital control algorithm running on a microprocessor. For a cost-effective solution is especially preferred a realization as an analog circuit comprising at least one error unit for the formation of an error size signal and at least one multivibrator for generating a switching signal to control the inverter.

A resonant converter according to the invention may produce two controllable output voltages which are separated from each other. If more than two output voltages are necessary for an application, they are divided into two groups and the voltages of each group can be controlled separately from the voltages of the other group. The formation of these groups is then made such that secondary units of the first type produce the output voltages of the first group, whereas secondary units of the second type produce the output voltages of the second group. Alternatively, the second group of output voltages can also comprise such voltages that are supplied by secondary units of both the first and the second type (stack output).

These and other aspects of the invention are apparent from and will be elucidated, by way of non-limitative example, with reference to the embodiment(s) described hereinafter.

Figure 1:
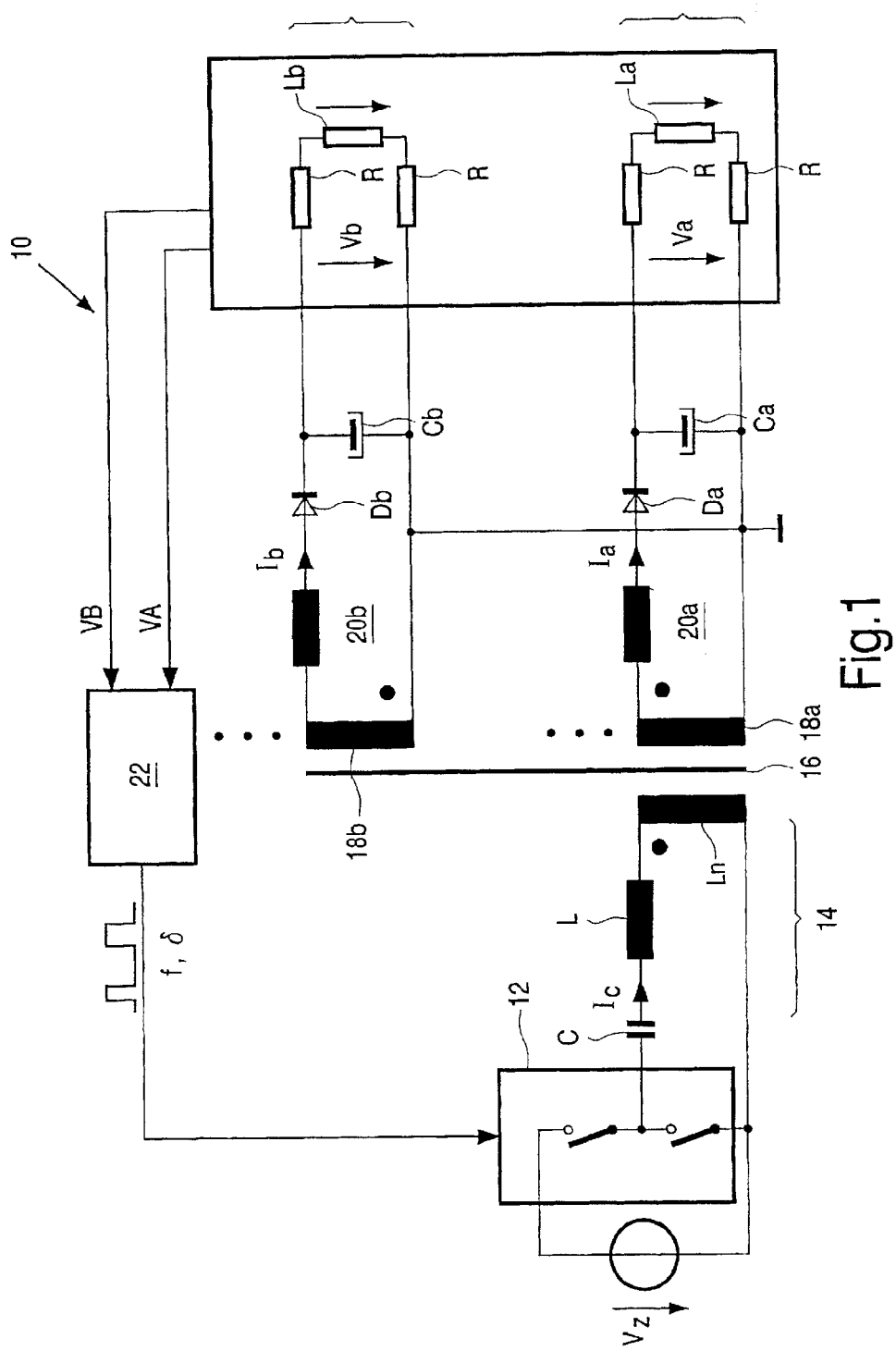
FIG. 1 shows a circuit diagram of a first embodiment of a resonant converter.
Figure 4A:
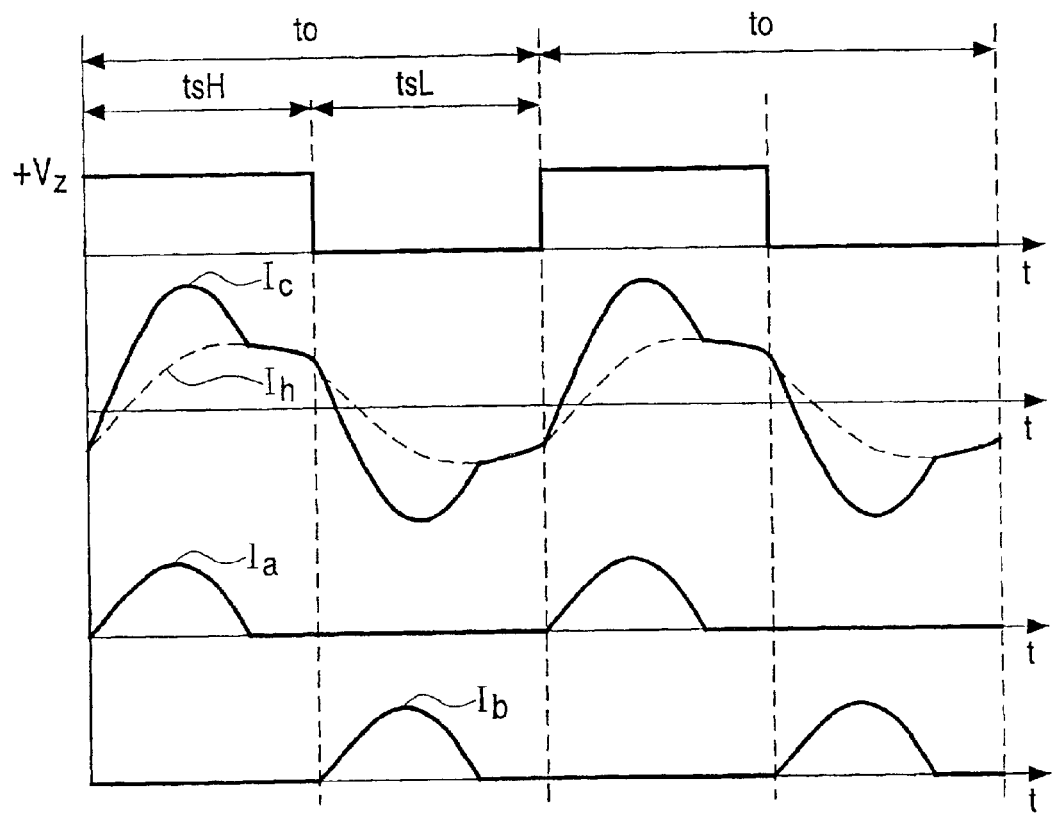
Figure 4B:
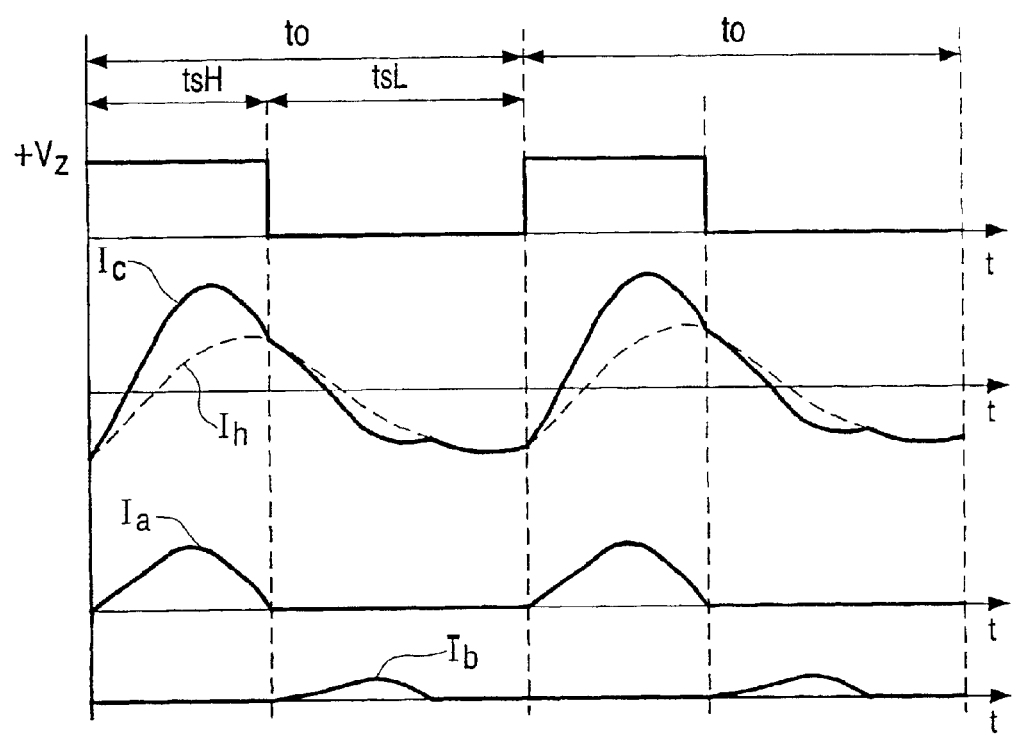
Figure 4C:
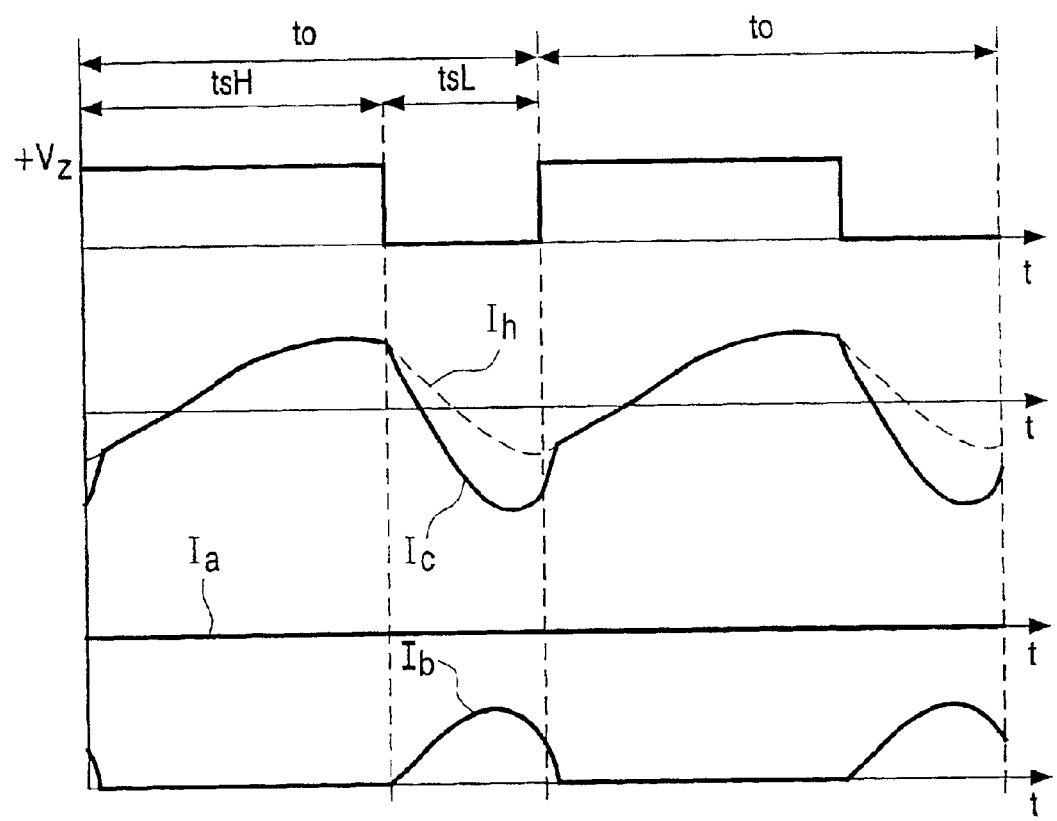
Figure 6:
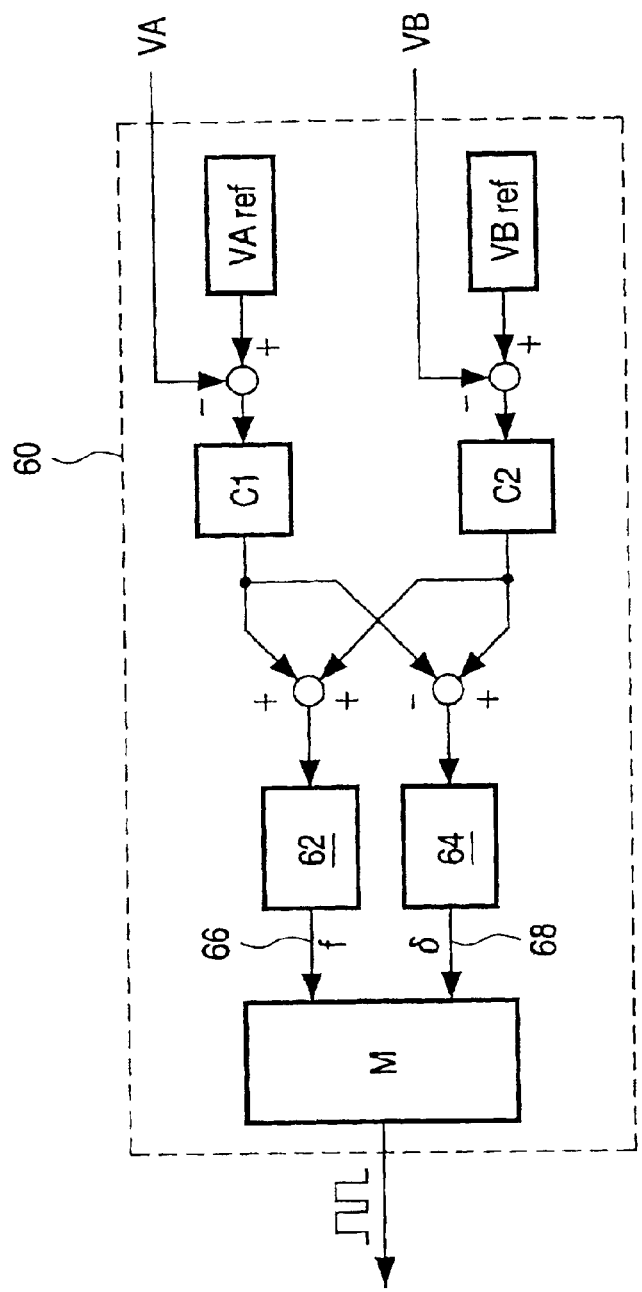
Figure 7:
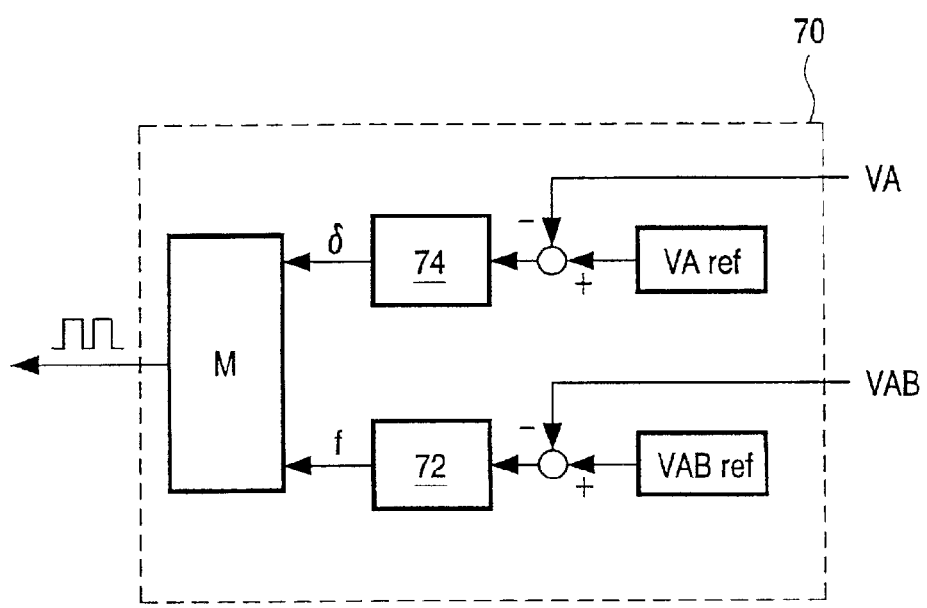
Figure 8:
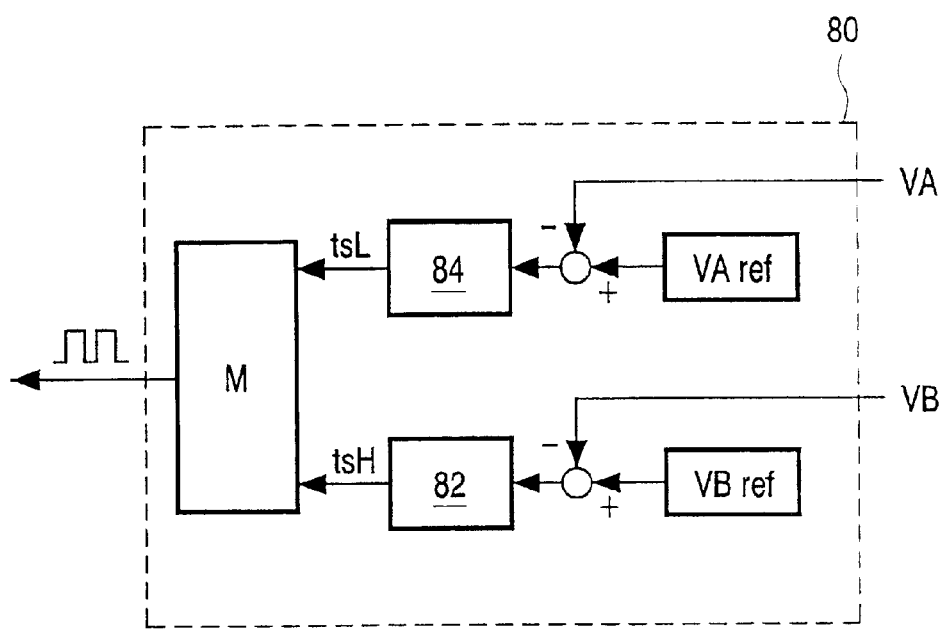
Figure 9:
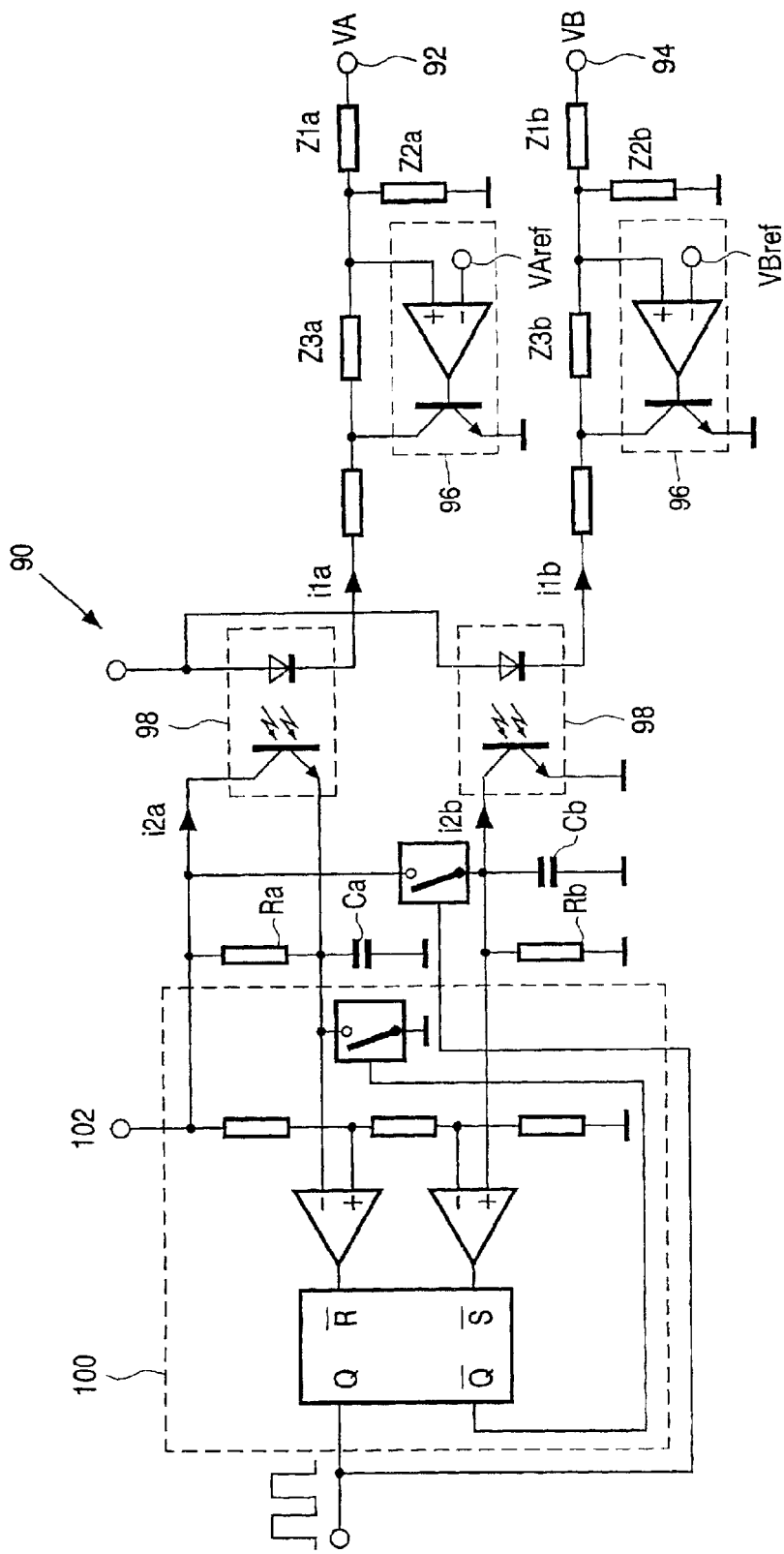
Figure 10:
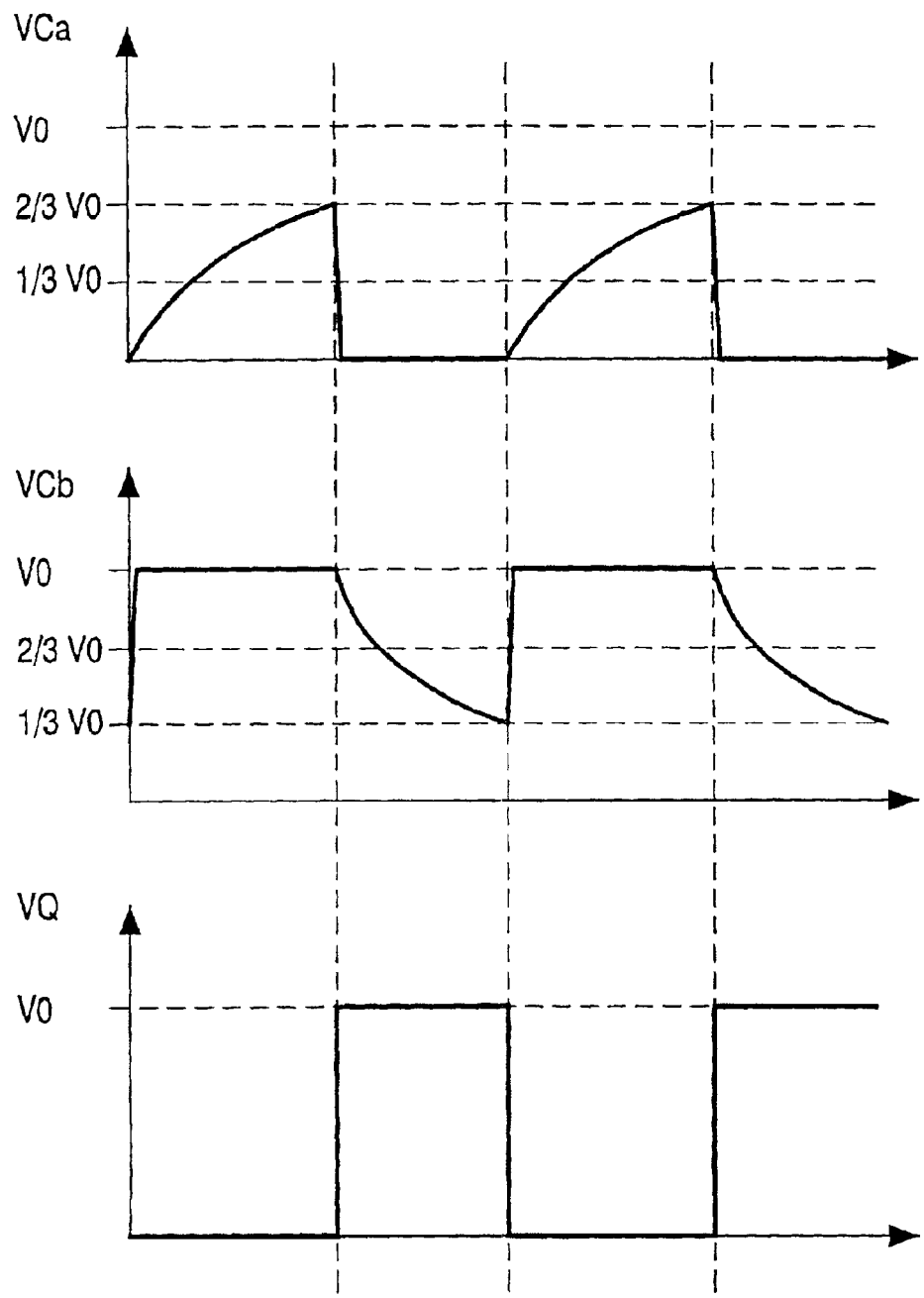

FIG. 4a shows a diagram with a representation of the waveform of currents and voltages of the circuit shown in FIG. 1 under idealized assumptions, FIG. 4b shows a diagram corresponding to that of FIG. 4a with a lower duty cycle and increased frequency, FIG. 4c shows a diagram as shown in FIGS. 4a, 4b with a higher duty cycle and further increased frequency, FIG. 5 shows a general block diagram of a control device, FIG. 5a shows a block diagram of a frequency controller, FIG. 5b shows a block diagram of a duty cycle controller, FIG. 6 shows a first embodiment of a control system, FIG. 7 shows a second embodiment of a control system, FIG. 8 shows a third embodiment of a control system, FIG. 9 shows a circuit diagram of a possible realization of the control system as shown in FIG. 8, FIG. 10 shows a diagram with a representation of the waveform of voltages of FIG. 9.

FIG. 1 shows a circuit diagram of a first embodiment of a resonant converter 10. The resonant converter 10 comprises an inverter 12 arranged as an asymmetrically switching half bridge which feeds a resonant circuit 14 which is in the form of a series capacitance C and the primary side of a transformer 16. FIG. 1 shows a primary-side series inductance L. This inductance combines the primary-side leakage inductance of the transformer and a possible external series inductance. The main inductance of the transformer is referred to as Lh. The inductances L and Lh together with the capacitance C form a series resonant circuit. For simplicity the circuit with the resonant capacitance C and the primary side of the transformer 16 is referred to as resonant circuit 14. In practice it must not be overlooked, obviously, that in addition, reactive elements of the secondary-side circuit are energized on the primary side and can also decisively influence particularly the resonant behavior of the resonant circuit 14.

The resonant converter 10 has two secondary units 20a, 20b. Each of the secondary units has a secondary winding 18a, 18b and a diode Da, Db. The secondary voltages Va, Vb present on the output of the secondary units 20a, 20b are smoothed by filter capacitors Ca, Cb and form output voltages (direct outputs) of the resonant converter 10. A load La, Lb is connected to the outputs of the converter 10 via terminals (for example plugs, lines etc.) featured by the transfer resistances R.

In the example of FIG. 1 the secondary units 20a, 20b are distinguished in that the secondary windings 18a, 18b have different winding orientations on the common core of the transformer 16. This is indicated in usual fashion with a dot. For the rest, the secondary units 20a, 20b are identical i.e. the respective secondary winding 20a, 20b has the same orientation as the respective rectifier diode Da, Db.

The lower secondary unit 20a will be referred to as secondary unit of the first type in the following. The secondary unit 20b depicted at the top in FIG. 1 is referred to as the secondary unit of the second type. As observed above, the difference between secondary units of the first and second types with the same wiring consists of the opposite winding orientations. The same effect may also be obtained in that the wiring is exchanged when the winding orientation is the same i.e. the diode Da or Db, respectively, is connected to the other winding end or its poles are exchanged (not shown). The effect of this is that with the secondary unit of the first type 20a a current flows through the diode Da, in essence, during the positive voltage swing, whereas this is the case during the negative voltage swing in the secondary unit of the second type 20b. This is achieved in that in each secondary unit 20a, 20b the voltage on the respective secondary winding 18a, 18b is half-wave rectified while in the secondary units of the first type 20a a current can flow across the diode Da only with a positive voltage swing, whereas the diode Da blocks with a negative voltage swing. Conversely holds for the secondary unit of the second type.

Inverter 12, when in operation, produces an AC voltage which is generated by alternate switching of its two controlled switches, for example realized by FETs. The inverter 12 is then driven in a way that it applies a pulse-width modulated switched AC voltage to the resonant system 14.

The inverter 12 is driven by a control system 22 for controlling the output voltages Va, Vb. The output voltages Va, Vb are measured. The output voltage can then be measured at the respective output terminals as shown in FIG. 1. Alternatively, the voltage can be detected at the load. Particularly at higher currents this is considerably more accurate.

The results of the measurements of the voltages Va, Vb are applied to the control system 22 as measuring signals VA, VB. The control system 22 compares the measured voltage signals VA, VB with the set values (not shown) and drives the inverter 12 so that the output voltages Va, Vb are adjusted to the desired set values.

For this purpose the inverter 12 is driven by the control system 22 so that it generates a pulse-width modulated voltage. The waveform of such a pulse-width modulated voltage is shown in FIG. 4a in the upper part. In a time interval of length t0, first the upper switch of the half bridge is closed, so that a positive voltage pulse having amplitude +VZ arises. This pulse has a duration tsH. Subsequently, the upper switch is opened and the lower switch is closed, so that the zero voltage is applied for a duration tsL. With constant amplitude VZ, predefined by the respective DC voltage, the waveform of the pulse-width modulated voltage is determined by the parameters switching frequency f, with f=1/t0, and duty cycle δ, with δ=tsH/t0. Alternatively, the waveform is also completely determined by predefining the times tsH, tsL. In the example of FIG. 4a the duty cycle is 50%.

The waveform shown in FIG. 4a is obviously idealized. Actually, during reversal there are dead times to avoid short-circuits, in which dead times none of the switches is closed. In addition, the pulse edges cannot instantaneously rise in practice, but there are waveforms with finite rise times, so that the voltage pulses become substantially trapezoidal.

With a resonant converter shown in FIG. 1 it is possible to control the two output voltages Va, Vb separately. The two voltages Va, Vb are then directly supplied by two secondary units 20a, 20b of opposite types. Therefore, as will be explained hereinafter, a suitable default of the parameters of the pulse-width modulated voltage (f, δ or tsH, tsL, respectively) can predefine such a drive that the output voltages Va, Vb can be controlled to the respective nominal value irrespective of each other.

As already observed, converter 10 is a resonant topology with a series capacitor C. This topology has a load-dependent resonant frequency, for which the resonant frequency in unloaded state is at least approximately known based on the components used. The circuit is operated at switching frequencies f which are clearly above the respective resonant frequencies. In this range of operation there is already a certain increase of voltage. By driving the resonant circuit 14 with a lower frequency, which then comes closer to the resonant frequency, the increase of resonance becomes stronger, so that the output voltages Va, Vb rise. Thanks to the two opposite types of secondary units 20a, 20b it is possible here, by additionally predefining the duty cycle δ, to allow the output voltages Va, Vb to increase or diminish relative to the others. This will be further explained with reference to FIGS. 4a–4c.

The FIGS. 4a, 4b, 4c show how a control of the output voltages Va and Vb is made possible by adaptation of frequency f or period duration t0=1/f and duty cycle δ. The waveforms of the output voltage of the inverter 12 (excitation voltage on the resonant circuit 14), of the current Ic flowing through the capacitor C, of the magnetizing current Ih flowing through the main inductance of the transformer 16, of the current Ia delivered by the secondary winding 18a and of the current Ib delivered by the secondary winding 18b are shown for two time periods t0. The waveform indicated in the FIGS. 4a, 4b, 4c is here to be used only for explaining the principle according to which the two outputs are controlled independently of each other. The waveforms shown represent the respective magnitudes under the assumption that all the winding ratios are equal to one and the magnitudes of the two secondary units 20a, 20b are identical i.e. Va=Vb. Furthermore, series inductances on the output side are assumed to be identical.

FIG. 4a shows the operating state in which the frequency f0=1/t0 is set to 1.47 times fr, fr being the resonant frequency of the unloaded converter 10 and being approximately determined as $$fr = \frac{1}{2\pi}\sqrt{\frac{1}{C[L+Lh]}}$$

C being the capacitance of the capacitor C, L the value of the primary-side series inductance and Lh the value of the main inductance of the transformer 16. The above equation only holds, however, for the case where the output-side converter is unloaded. In case of an output-side load, there is one of the output-side leakage inductances and generally also a shift depending on the load. To determine the exact resonant frequency for the loaded converter 10 is relatively expensive. Therefore, only the resonant frequency fr indicated above is used as a reference magnitude for the frequency.

The duty cycle in case of operation is selected to be 50% according to FIG. 4a. Current characteristics of Ia and Ib having (substantially) identical half waves during the time spaces tsH and tsL, respectively, are generated in the time spaces tsH or tsL in this state of operation. With the state of operation according to FIG. 4b the frequency f0=1/t0 is increased to the 1.53-fold of fr. The duty cycle is reduced to 40%. As against the state of operation shown in FIG. 4a the current characteristic Ia has remained substantially the same. The current characteristic Ib now has half waves with reduced amplitude, so that the power transported over the secondary winding 18b to the output of the second secondary unit 20b is reduced. FIG. 4c shows an operation with a frequency f0=1/t0 equal to 1.55 times fr and a 65% duty cycle. In this case the current Ia is, in essence, reduced to zero and the amplitude of the half waves of Ib is increased compared to FIG. 4, so that in this case the secondary winding 18a does not transport power to the output of the first secondary unit 20a, but the secondary winding 18b transports power increased relative to FIG. 4b from the secondary winding 18b to the output of the secondary unit 20b.

The examples of operating states according to FIGS. 4a–4c show that with the converter circuit shown in FIG. 1 a highly variable adjustment to different loads of the various converter outputs is possible. With such a converter it is possible, in particular, to achieve small tolerances of the output voltages even in the case of low output voltages and high output-currents as they are necessary in modem microprocessors.

Figure 2:
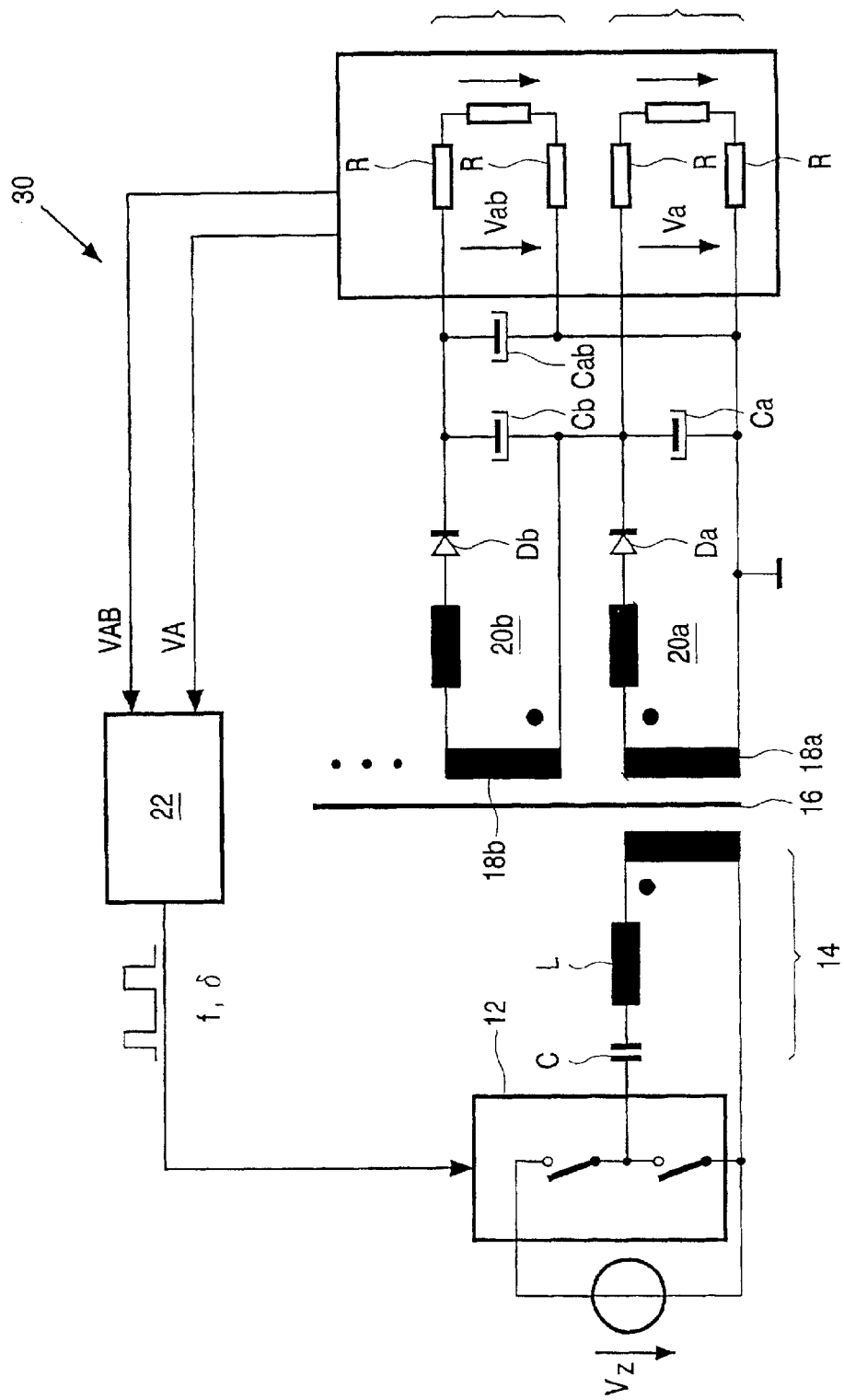
FIG. 2 shows a circuit diagram of a second embodiment of a resonant converter.

FIG. 2 shows in a second embodiment a resonant converter 30. The converter 30 has a largely similar structure to the converter 10 of FIG. 1, like elements being referred to by like characters. In the following, therefore, only the differences are discussed.

Contrary to the converter 10 of FIG. 1, the output voltages with the converter 30 of FIG. 2 are tapped from different points of the circuit. The first output voltage Va is in both cases the output voltage of the first secondary unit 20a (direct output). With the converter 30, however, a second output voltage Vab is used, which drops via the series combination of the first secondary unit and the second secondary unit 20b. This form of the output is referred to as "stack" output. The use of such a stack output is particularly advantageous when a very high power level is necessary on this output. The output voltage Vab is filtered via an additional filter capacitance Cab.

Also in the second embodiment of the converter 30 the two output voltages, in this case Va, Vab, can be controlled separately by the control system 22.

The first and second embodiments shown in FIGS. 1 and 2 show respective converters with only two output voltages which can be controlled independently. In practice, however, often converters are necessary which are capable of generating a plurality of output voltages, for example, ten or more different output voltages. This is possible with the converters 10 and 30 from the FIGS. 1 and 2, respectively, in that, as indicated there by points, further secondary units are added which comprise a secondary winding and a rectifier element. The output voltages are then divided into two groups, the output voltages of the first group being generated on secondary elements of the first type and the output voltages of the second group being generated on secondary elements of the second type. The two groups of output voltages can then be controlled separately from the other group. Within the group the output voltages, however, are strongly correlated via the number-of-windings ratio of the respective secondary windings. Therefore, only a voltage of the first group and a voltage of the second group is taken into account for the control. The other voltages are then "controlled along".

Figure 3:
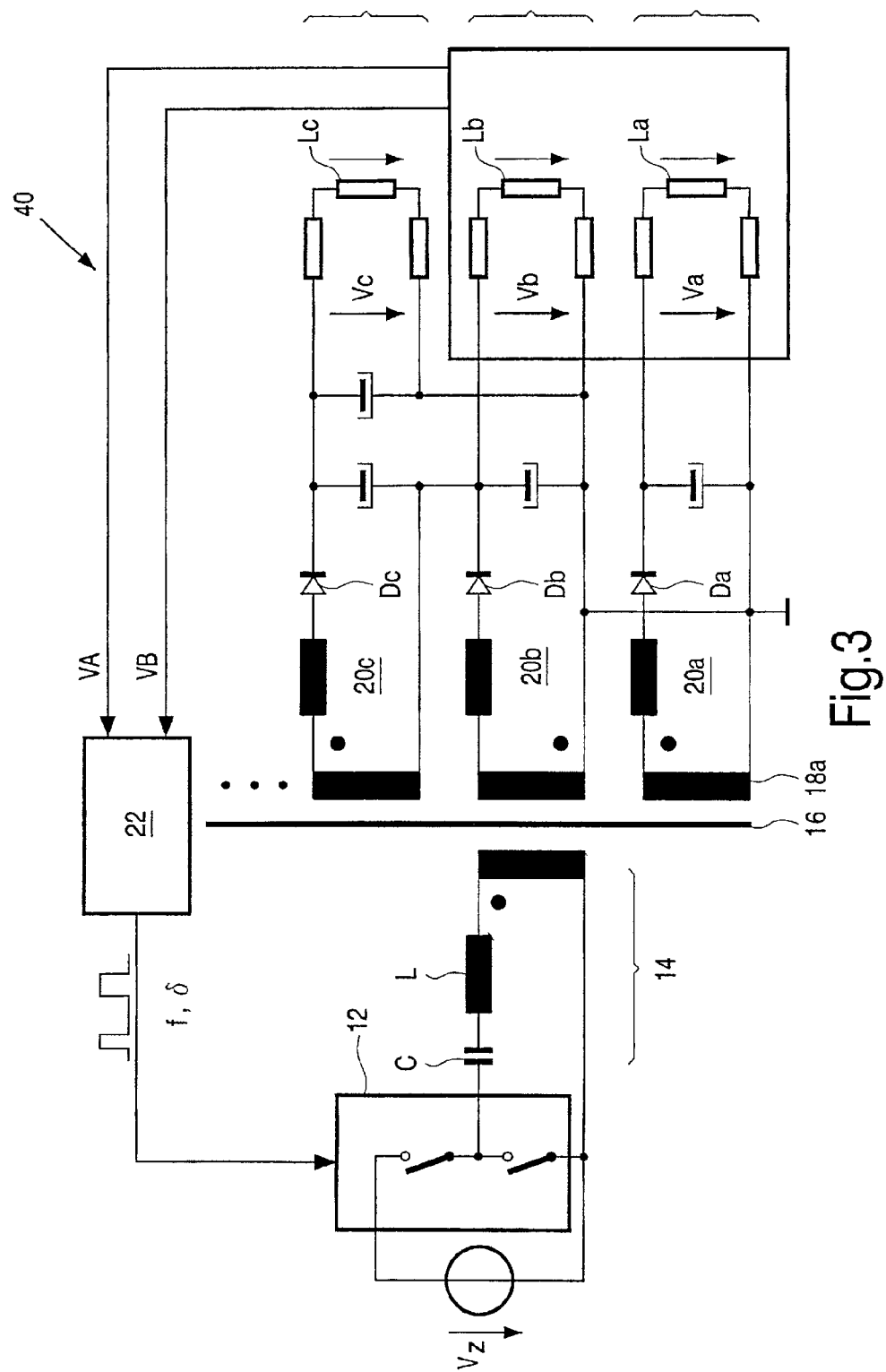
FIG. 3 shows a circuit diagram of a third embodiment of a resonant converter.

The various ways of wiring the secondary units shown in FIGS. 1 and 2 may also be combined here. FIG. 3 shows by way of example a respective third embodiment of the converter 40. This converter 40 supplies the three loads La, Lb, Lc with the respective output voltages Va, Vb, Vc. The output voltages Va and Vb correspond to the secondary voltages of the secondary elements 20a, 20b, respectively. In addition, a "stack output" produces an output voltage Vc which is supplied with power by the series combination of a secondary unit 20c, which is a secondary unit of the first type, and secondary unit 20b, which is a secondary unit of the second type. In the example shown only the output voltages Va, Vb are measured and controlled by the control system 22. The output voltage for supplying the load Lc with power is substantially "controlled along" here. Alternatively, also other output voltages may be controlled (directly), for example, Vc and Vb or Va and Vc.

The control system 22 will be discussed in more detail below. A block diagram which represents a basic structure of this control system, is shown in FIG. 5.

The control system 22 picks up two voltage measuring signals at the two inputs V1, V2. For example, in the first embodiment of a converter 10 they are the measuring signals VA, VB; in the second embodiment of a converter 30 the measuring signals VA and VAB. Filters (which may also be left out as required) generally represented as filters F first filter these signals. Subsequently, these signals are compared so as to form a control difference with the respective reference voltages V1ref, V2ref. These may be preset by reference voltage sources or preset values in the control system 22. Alternatively, it is also possible for these preset values to be taken as input signals. This is followed by a standardization with the factors c1 and c2 while these factors are preferably set so that c1/c2 =V2ref/V1ref. This scaling makes it possible for two set values V1ref, V2ref to be preset which strongly differ from each other. Without such a scaling a proportionally slight control deviation from a larger set value has a very strong influence on the control, whereas a proportionally serious deviation from the smaller set value would have only a slight influence. The deviations scaled in this manner are referred to as $\Delta a$, $\Delta b$.

These scaled control deviations $\Delta a$, $\Delta b$ are decoupled in a decoupling unit 50. "Decoupling" is here understood to be the subdivision of the information contained in the deviations $\Delta a$, $\Delta b$ into information referring to the frequency, on the one hand, and the duty cycle, on the other. Mathematically this may be represented by multiplication of the vector of the control deviation ($\Delta a$, $\Delta b$) by a decoupling matrix $A_D$. Results of the decoupling operation are the magnitudes $\Delta f$ and $\Delta \delta$ which are used as a preset value for adaptations of the frequency ($\Delta f$) and duty cycle ($\Delta \delta$), respectively.

The two output values $\Delta f$ and $\Delta \delta$ of the decoupler are each supplied to one-dimensional controllers 52, 54. The controller 52 then controls the switching frequency f of the pulse-width modulated voltage, whereas the controller 54 controls the duty cycle $\delta$ of the pulse-width modulated voltage.

The structure of the controllers 52, 54 is shown in FIGS. 5a and 5b in the form of block diagrams. Both the controller 52 which supplies the preset value S$\delta$ for the frequency and the controller 54 which supplies the preset value S$\delta$ for the duty cycle utilize initial values for frequency f0 and duty cycle $\Delta 0$ to which control correctors are added. In the case of the controller 54, which supplies a preset value S$\delta$ for the duty cycle, the control correction is determined by an I, PI or PID controller from the signal $\Delta \delta$ and added for, for example, 50% to the preset value $\delta 0$. The controller 52 for the frequency has the same structure. Here too a correction is determined from the magnitude $\Delta f$ via an I, PI or PID controller, which correction is added to the initial value f0. The integral part of the controller used may also compensate a lasting control error so that the accuracy of the preset value f0 or $\delta 0$, respectively, is not decisive.

In the duty cycle controller 54 though there is first a multiplication by a constant factor c3. This factor is used here for laying down the control strategy in dependence on the respective available converter circuit to be controlled. The constant c3 adopts a value 1 if in FIG. 5 the measuring signal V1 is the output voltage of a secondary unit of the first type and the measuring signal V2 the output voltage of a secondary unit of the second type. If the proportions are reversed i.e. if V1 is the measuring signal of the output voltage of a secondary unit of the second type and V2 the measuring signal of an output voltage of the first type, the constant C3 has the value $-1$.

The preset control values of the controllers 52, 54 drive a modulator M for generating a drive signal for the inverter 12. In the examples shown in FIGS. 1–3, the inverter 12 comprises an asymmetrically switching half bridge with a half-bridge driver. The half-bridge driver is supplied with a pulse signal while the upper switch is closed in case of the Hi level of the pulse signal and, in case of a Lo level, the bottom switch of the half bridge is closed and the upper switch is opened. The modulator M generates such a pulse signal in accordance with a predefined controller 52 for switching frequency and the predefined controller 54 for the duty cycle.

The block diagram shown in FIG. 5 generally holds for the control of two voltages by predefining frequency and duty cycle of the pulse-width modulated voltage. Depending on the type of the controlled voltages V1, V2, different decouplers 50 are used here as shown in the following examples:

EXAMPLE 1

Two Independent "Direct" Output Voltages.

For the first embodiment of a converter 10 as shown in FIG. 1, in which the secondary voltages of two secondary units 20a, 20b of opposite types directly form the output voltages Va, Vb, the preset value $\Delta f$ on the frequency controller 52 is the sum of the scaled control deviations $\Delta a$, $\Delta b$ and the predefined value $\Delta \delta$ on the duty cycle controller 54 is the difference between these scaled control deviations. If the operation carried out in this case by the decoupler 50 is expressed as a matrix multiplication $$A_D \cdot \begin{pmatrix} \Delta a \\ \Delta b \end{pmatrix}, A_D = \begin{pmatrix} 1 & 1 \\ -1 & 1 \end{pmatrix}$$

is used as a decoupling matrix. The above-mentioned selection of the constant c3 of the controller 54 is to be noticed.

EXAMPLE 2

A "Direct" Output Voltage, a "Stack" Output.

For the second embodiment of a converter 30 as shown in FIG. 2, in which an output voltage Va is delivered by a secondary unit 20a of the first type, the second output voltage Vab, however, is delivered by a secondary unit of the second type 20b in common with the secondary unit of the first type 20a (stack output), preferably a deviating function of the decoupler 50 is used. The scaled control deviation $\Delta a$ (control deviation of the stack output) should then be used as a preset value $\Delta f$ for the frequency controller 52 and as a preset value $\Delta \delta$ for the duty cycle controller 54 should be used the scaled control deviation $\Delta b$ (control deviation on the direct output). Written as a matrix, a decoupling matrix is evolved which is equal to the unit matrix:

$$A_D = \begin{pmatrix} 1 & 0 \\ 0 & 1 \end{pmatrix}.$$

FIG. 6 shows a first embodiment for a realization of the general control system 22 of FIG. 5.

In accordance with the first example explained above, the control system 60 works with measuring signals VA, VB for the output voltages Va, Vb of the first embodiment of a converter 10 as shown in FIG. 1. For the two output voltages are internally defined fixed set values VAref, VBref. The voltages measured VA, VB are subtracted from the set values to obtain the control difference. Subsequently, a scaling with the factors c1, c2 takes place where the following holds:

$$\frac{c1}{c2} = \frac{VAref}{VBref}.$$

The sum of the thus scaled control deviations is formed and applied to a PID controller 62 (frequency controller). The structure of the controller 62 has been explained above in conjunction with FIG. 5a. Since VA is a measuring signal of an output voltage of a secondary unit of the first type and VB a measuring signal of an output voltage of the second type, the internal constant c3 has the value 1.

At the same time, a difference is formed and applied to a PID controller 64 (duty cycle controller). The duty cycle controller 64 corresponds to FIG. 5b. The frequency controller 62 applies to the modulator M a value which predefines the frequency f of the pulse signal generated by the modulator M. The duty cycle controller 64 applies a signal 68 to the modulator M, which signal predefines the duty cycle δ of the pulse signal generated by the modulator M. The modulator M drives the inverter 12 through a driver, so that the inverter produces a pulse-width modulated voltage with the respective predefined values for frequency and duty cycle with which inverter the resonant circuit 14 is excited.

If, for example, the output voltage VA measured on an output of the converter 10 is smaller than the predefined set value VAref, this will lead to a (positive) control difference. Since the sum of the control difference is also positive, there will be a reduction of the frequency set by the controller 62, on the one hand. Since, on the other hand, the difference of the control deviations is negative, there will also be a reduction of the duty cycle predefined by the controller 64 which is the duty cycle of the pulse signal generated by the modulator M (and thus of the output voltage of the inverter 12). As shown in FIG. 4b this implies that the output voltage Va is increased relative to the output voltage Vb.

FIG. 7 shows a second embodiment for a realization of the general control system 22 shown in FIG. 5. The control system 70 is used for controlling the second embodiment of a converter 30 as shown in FIG. 2, in which an output voltage Va is a "direct" output (output voltage Va is the output voltage of the secondary unit of the first type 20a), the second output voltage Vab, however, is an output voltage on a "stack" output whose voltage drops via the series combination of the secondary unit 20a of the first type and the secondary unit 20b of the second type. The output voltages Va, Vab are measured and applied to the control system 70 as measuring signals VA, VAB. The voltages are compared to set values VAref, VABref, respectively. Since in this special case the decoupling is omitted (second example of FIG. 5, the decoupling matrix is an identity matrix), a scaling is not necessary. The control deviation of the voltage Vab of the stack output is directly applied to a PID controller 72 for controlling the frequency f. The control deviation of the output voltage Va is directly applied to a PID controller 74 for a predefined value of the duty cycle δ. The structure of the controller here corresponds to that of the controllers 52, 54 explained above.

If, for example, the voltage Vab on the stack output drops below the set value VABref, this will lead to a positive control difference which is applied to the PID controller 72. This leads to a reduction of the frequency f, so that by utilizing an energizing frequency that is closer to the resonant frequency of the resonant circuit 14, the two output voltages—and thus the output voltage Vab on the stack output—rise. The consequently caused control deviation of the output voltage Va from the predefined set value VAref is subsequently adjusted by the duty cycle controller 74 to which the control deviation is applied and by increase of the duty cycle δ.

FIG. 8 shows a third embodiment of a control system 80. Differently from the control systems 60, 70 of FIGS. 6 and 7, the control system 80 does not utilize the frequency and duty cycle of the pulse-width modulated voltage as parameters for the predefined value of the driving of the inverter 12, but the respective switch times tsH, tsL for the top or bottom switch respectively of the half bridge of the inverter 12. The structure of the control system 80 is very simple. Nevertheless, the converter 10 of FIG. 1 can be controlled effectively with this structure.

The control deviations from the predefined set values VAref, VBref are first determined for the two output voltages Va, Vb from the measuring signals VA, VB. The thus formed control deviation of the measuring voltage VA is applied to a controller 84 as a predefined value for the switch time for the lower switch tsL. Similarly, the control deviation from the measuring voltage VB is applied to a controller 82 as a predefined value of the switch time of the upper switch tsH. A modulator M then generates a pulse signal from the predefined values tsH, tsL to drive the inverter 12.

The controllers 82, 84 for the switch times tsL, tsH may optionally produce predefined values for the minimum and/or maximum values for tsL, tsH. As a result, minimum and maximum values are predefined for the switching frequency, so that operation always takes place in a defined frequency range.

Hereinafter will be given an example for the operation of the control system 80:

If the measuring voltage VA of the output voltage Va of the converter 10 of FIG. 1 drops below a predefined set value VAref, there is a (positive) control difference which is applied to the controller 84. The controller 84 then increases the switch duration tsH for the "negative" voltage pulse of the pulse-width modulated voltage i.e. when a half bridge is used, the time space in which the voltage is zero. As may be learnt from the FIGS. 4a–4c and the respective explanations, this leads to an increase of the power on output Va, so that the control deviation can be adjusted.

As already observed, the examples of embodiment for controlling systems described above may be realized in a very different manner. More particularly, the control algorithms may be realized as a program running on a signal processor or microprocessor. Hereinbelow an example of the control system 80 of FIG. 8 will be described with reference to FIG. 9 in which the control system is arranged as a very simple analog circuit. Since individual components of this analog circuit are available as cost-effective standard modules anyway, an extremely cost-effective realization is possible in this manner.

FIG. 9 shows a circuit 90 which generates a pulse signal for driving the inverter 12, which pulse signal is based on the measuring signals VA, VB of the output voltages of the converter 10 of FIG. 1.

The measuring signals VA, VB which are available in analog form as measuring voltages are first scaled by a voltage divider in the form of impedances Z1a, Z2a at the input 92 or Z1b, Z2b at the input 94, respectively. Such a scaling is necessary when internal reference voltages are used which are available only in certain values. The measuring signals VA, VB may also be filtered by a suitable selection of the impedances.

The down-converted voltage on each of the inputs 92, 94 is first applied to a respective error amplifier 96. These amplifiers are indicated by dashed boxes and are available as integrated modules. They are integrated standard circuits referenced "431". On the inverting input of the operational amplifier included therein, the internal reference voltage VAref, VBref is available with which the scaled measuring voltage VA, VB, respectively, is compared by the impedances Z1a, Z2a and Z1b, Z2b, respectively. The error amplifiers 96 are fed back via impedances Z3a, Z3b so that an adjustable (PID) control behavior evolves via the value of the impedances Z3a, Z3b. In this way the value of the current i1a and i1b, in FIG. 9 is controlled.

An optocoupler 98 in which the current i1a or i1b flows through the LED is always connected to the error amplifier 96. A DC isolation—often prescribed for applications of power supplies—of the right-hand part of circuit 90 with the inputs 92, 94 from the left-hand part of the circuit 90 is often effected by the optocoupler 98. Each one of the optocouplers 98 transfers an analog signal in the form of currents i1a, i1b. Alternatively, the DC isolation may also be achieved in that the whole circuit 90 is located on the secondary side and only the (digital) pulse signal is transmitted to the inverter 12 via a (digital) optocoupler.

On the left side of the circuit 90 in FIG. 9 an integrated timer module 100 (for example, a known integrated module referenced "555" may be used) is arranged as a multivibrator which launches a pulse signal of the Hi and Lo states on its Q-output. In the circuit according to FIG. 9 the currents i1a, i1b and on the other side of the optocoupler 98 i2a, i2b, respectively, indicate the time of the Lo level (predefined via i2a) and of the Hi level (predefined via i2b).

In the circuit shown the time until the switch-over by the Lo output level of the Q output to the Hi level, or vice versa, is predefined via the charging time of the capacitances Ca, Cb. The voltages at these capacitances Ca, Cb are each compared by internal comparators inside the timer module 100 with the down-converted supply voltage 102. When the voltages compared match, a switching pulse is generated so that the flip-flop tumbles. Via a discharge output (represented as a switch in FIG. 9) the capacitances are then discharged (Ca) abruptly or charged to the supply voltage 102 (Cb).

The capacitance Ca is then charged with the current i2a. In parallel herewith the charging of the capacitance Ca is also effected via the resistor Ra connected to the supply voltage 102. In similar manner the capacitance Cb is discharged to ground via i2b while there is also a discharge via the resistor Rb. In this manner a maximum switch-on time for Hi or Lo level can be predefined via the resistors Ra, Rb and thus a minimum frequency. This can also be calculated from the time constants Ra*Ca or Rb*Cb, respectively.

The waveform of several voltages from the circuit shown in FIG. 9 is shown in FIG. 10. The respective periodic waveform of the voltage VCa at the capacitance Ca and of the voltage VCb at the capacitance Cb of FIG. 9 is shown. At the bottom of FIG. 10 the pulse signal on the Q output of the multivibrator module 100, VQ, is finally shown. The voltages are indicated scaled to the supply voltage V0.

FIG. 10 then shows how the voltage at the capacitance Ca is periodically charged with the current i2a up to ⅔V0. At ⅔V0 the upper comparator of the multivibrator module 100 switches so that a pulse is released at the inverse R input of the flip-flop. The pulse signal voltage VQ then jumps from the Hi to the Low level. The capacitance Ca is then discharged abruptly via the discharge output (shown as a switch in FIG. 9). As long as VQ has the Hi level, the capacitance Cb, which is originally charged to the value of the supply voltage V0, is discharged with the current i2b. When ⅓V0 is reached, the flip-flop tumbles due to the switching pulse of the inverse S input, so that VQ again changes to the Lo level.

In the operation shown in FIG. 10 the currents i2a, i2b thus determine the respective charging or discharging curves of the capacitances Ca, Cb and thus the period of time until the respective switching threshold is reached.

The operation of the control by circuit 90 will be explained hereinafter with reference to an example:

First it is assumed that the measuring voltages VA, VB down-converted by the voltage dividers Z1a, Z2a and Z1b, Z2b, respectively, are equal to internal reference voltages VAref, VBref present on the inverting input of the operational amplifiers included in the error amplifier 96. If, for example, the output voltage Vb rises, so that the down-converted measuring voltage VB exceeds VBref, the current i1b will rise and thus also the current i2b. This causes the capacitance Cb to be discharged faster, so that the switch-on time of the Hi level is shortened. This causes an increase of the frequency and at the same time a reduction of the duty cycle if the pulse signal on the Q-output is regarded as a pulse-width modulated voltage as regards frequency and duty cycle. As a result, the two output voltages drop (as a consequence of the increased frequency), but Va rises compared to Vb (as a result of the reduced duty cycle). In this way the control deviation is adjusted.

In this respect the invention may be summarized in that a resonant converter and a control method for a resonant converter are proposed. The resonant converter comprises a resonant circuit with a transformer, which circuit is fed with a switched AC voltage, preferably a pulse-width modulated voltage by an inverter. The circuit comprises a plurality of secondary units each comprising a secondary winding of the transformer and at least one rectifier element (diode). The secondary units are subdivided into secondary units of the first and of the second type while secondary units of the first type and secondary units of the second type have opposite orientations. Secondary units of opposite types preferably have either different winding orientations with the same wiring, or the same winding orientation with opposite wiring. The resonant converter produces at least two output voltages of which a first output voltage depends on the voltage on the first secondary unit (direct output) and the second output voltage either only on the voltage of the second secondary unit or on the voltage of the first and second secondary units (stack output). The converter additionally has a control system for separately controlling the two output voltages, which output voltages are predefined by the inverter drive. In various embodiments the inverters receive predefined values of either frequency and duty cycle or the pulse durations of the pulse-width modulated voltage to be generated, so that with these two parameters as setting signals the two output voltages can be controlled independently of each other. Different controllers are proposed for different output configurations.

What is claimed is:

1. A resonant converter comprising
an inverter that generates an AC voltage,
a resonant circuit supplied with the AC voltage and comprising
at least a capacitor and
at least a transformer, and
at least two secondary units, each formed by
at least one respective secondary winding of the transformer and
at least one respective ractifier element,
wherein:
a first secondary unit and a second secondary unit of the at least two secondary units have opposite orientations,
at least two output voltages are supplied
a first output voltage of which being supplied by the first secondary unit and
a second output voltage either by the second secondary unit or by the first and the second secondary unit, and
a control system is provided for controlling the first and second output voltage by driving the inverter.

2. A resonant converter as claimed in claim 1, wherein the secondary units are of two types,
the secondary units of a first type having opposite orientation to the secondary units of a second type.

3. A resonant converter as claimed in claim 2, wherein two groups of output voltages are supplied, each group comprising one or more output voltages,
a first group of the output voltages being fed by one or more secondary units of the first type, and
a second group of the output voltages being fed by either one or more secondary units of the second type or secondary units of the first and of the second type.

4. A resonant converter as claimed in claim 3, wherein the control system controls an output voltage of the first and an output voltage of the second group to a set value.

5. A resonant converter as claimed in claim 1, wherein the inverter is driven by a pulse signal so that a pulse-width modulated voltage is supplied for feeding the resonant circuit.

6. A resonant converter as claimed in claim 5, wherein the control system is arranged so that it produces two set values which define a characteristic waveform of the pulse-width modulated voltage.

7. A resonant converter as claimed in claim 6, wherein the two set values are switch-on times for a first and a second voltage pulse, and
the first voltage pulse is positive, and
the second voltage pulse is zero or negative.

8. A resonant converter as claimed in claim 6, wherein the two set values are a switching frequency and a duty cycle.

9. A resonant converter as claimed in claim 8, wherein:
the control system is arranged so that it determines a first and a second control error size for the first and second output voltage to be controlled, and
calculates
a cumulative sum which depends on a sum of the first and second control error sizes, and
a cumulative difference which depends on a difference between the first and second control error sizes,
the cumulative sum is applied to a controller for the switching frequency, and
the cumulative difference is applied to a controller for the duty cycle of the pulse-width modulated voltage.

10. A resonant converter as claimed in claim 8, wherein:
the control system is arranged so that it determines a first and a second control error size for the first and second output voltage,
the first control error size is applied to a controller for the duty cycle, and
the second control error size is applied to a controller for the frequency of the pulse-width modulated voltage.

11. A resonant converter as claimed in claim 7, wherein the control system is arranged so that it determines a first and a second control error size for the first and second output voltages,
a duration of a first voltage pulse of the pulse-width modulated voltage being determined from the first control error size, and
a duration of a second voltage pulse of the pulse-width modulated voltage being determined from the second control error size.

12. A resonant converter as claimed in claim 7, wherein:
the control system is realized as an analog circuit comprising
at least two error units that form error size signals, and
at least one multivibrator that generates a pulse signal to control the inverter, and
a pulse duration of the pulses of the pulse-width modulated voltage generated by the inverter is dependent upon the error size signals.

13. A control method for a resonant converter comprising:
generating an AC voltage;
driving a first secondary unit of the resonant converter by a first phase of the AC voltage to provide a first output voltage;
driving a second secondary unit of the resonant converter by a second phase of the AC voltage to provide a second output voltage;
comparing the first output voltage to a first reference voltage to produce a first error signal;
comparing the second output voltage to a second reference voltage to produce a second error signal; and
controlling the AC voltage based on the first and second error signals.

14. A switched-mode power supply comprising
a power supply input circuit for connection to the electricity mains and for delivering an indirect DC voltage, and
a resonant converter as claimed in claim 1 which is supplied with power by the indirect DC voltage.

15. The method of claim 13, wherein
the first error signal controls the first phase of the AC voltage, and
the second error signal controls the second phase of the AC voltage.

16. A resonant converter as claimed in claim 11, wherein:
the control system is realized as an analog circuit comprising
at least two error units that forms error size signals, and
at least one multivibrator that generates a pulse signal to control the inverter, and
a pulse duration of the pulses of the pulse-width modulated voltage generated by the inverter is dependent upon the error size signals.

17. A resonant converter as claimed in claim 4, wherein the inverter is driven by a pulse signal so that a pulse-width modulated voltage is supplied for feeding the resonant circuit.

18. A resonant converter as claimed in claim 17, wherein the control system is arranged so that it controls a switching frequency and a duty cycle of the AC voltage.

19. A resonant converter as claimed in claim 18, wherein:
the control system is arranged so that it
  determines a first and a second control error size for the first and second output voltage to be controlled, and calculates
    a cumulative sum which depends on a sum of the first and second control error sizes, and
    a cumulative difference which depends on a difference between the first and second control error sizes,
  the cumulative sum is applied to a controller for the switching frequency, and
  the cumulative difference is applied to a controller for the duty cycle of the pulse-width modulated voltage.

20. A resonant converter as claimed in claim 17, wherein
the control system is arranged so that it determines a first and a second control error size for the first and second output voltages,
a duration of a first voltage pulse of the pulse-width modulated voltage being determined from the first control error size, and
a duration of a second voltage pulse of the pulse-width modulated voltage being determined from the second control error size.

\* \* \* \* \*